(12) United States Patent
Henriet et al.

(10) Patent No.: US 7,223,008 B2
(45) Date of Patent: *May 29, 2007

(54) BACKLIGHTING DEVICE FOR AN INFORMATION DISPLAY ELEMENT OF A PORTABLE OBJECT

(75) Inventors: Fabien Henriet, Courtételle (CH); François Klopfenstein, Delémont (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 50 days.

This patent is subject to a terminal disclaimer.

(21) Appl. No.: 10/869,065

(22) Filed: Jun. 17, 2004

(65) Prior Publication Data

US 2005/0185389 A1 Aug. 25, 2005

(30) Foreign Application Priority Data

Feb. 20, 2004 (EP) .................................. 04003854

(51) Int. Cl.
*F21V 8/00* (2006.01)

(52) U.S. Cl. ...................... 362/617; 362/602; 362/615; 362/612; 362/618; 362/619; 362/608

(58) Field of Classification Search ................. 362/26, 362/606–608, 610, 612, 617–619, 622–624, 362/627, 600, 602
See application file for complete search history.

(56) References Cited

U.S. PATENT DOCUMENTS 2,823,476 A 2/1958 Miles

| 4,729,068 | A | * | 3/1988 | Ohe | 362/615 |
| 5,134,549 | A | * | 7/1992 | Yokoyama | 362/623 |
| 5,363,294 | A | * | 11/1994 | Yamamoto et al. | 362/330 |
| 5,521,797 | A | * | 5/1996 | Kashima et al. | 362/617 |
| 5,886,759 | A | * | 3/1999 | Mashino et al. | 349/65 |
| 5,921,651 | A | * | 7/1999 | Ishikawa | 362/624 |
| 5,957,561 | A | * | 9/1999 | Ono et al. | 362/617 |
| 6,017,127 | A | * | 1/2000 | Kurple | 362/29 |

(Continued)

FOREIGN PATENT DOCUMENTS

EP 1 347 351 9/2003

(Continued)

*Primary Examiner*—Renee Luebke
*Assistant Examiner*—Robert May
(74) *Attorney, Agent, or Firm*—Sughrue Mion, PLLC (57) ABSTRACT

The backlighting device (1) enables an information display element of a portable object such as a wristwatch to be illuminated from the back. This device comprises a light guide plate (7) having a front face and a rear face, a light reflector (6) located on the rear face of the light guide plate, a light diffuser film (9) and a rectifier film (11) located on the front face of the light guide plate and a source of visible light (2). This light source, such as a light emitting diode (2), feeds light beams to the edge of the light guide plate, which spread in the light guide plate between its two faces. A layer, such as a diffuser film, has a zone (10') with opacity decreasing from a limit (25) located close to the boundary area of the light guide plate, which receives the light beams of the light source, in order to attenuate the intensity of the light crossing said zone. This zone with decreasing opacity is, for example, a shading white or black dye disposed on the diffuser film.

17 Claims, 4 Drawing Sheets

U.S. PATENT DOCUMENTS

| | | |
|---|---|---|
| 6,582,095 B1 * | 6/2003 | Toyoda .................. 362/235 |
| 6,669,350 B2 * | 12/2003 | Yamashita et al. ......... 362/612 |
| 7,128,460 B2 * | 10/2006 | Hosobuchi ................ 362/626 |
| 2003/0123247 A1 | 7/2003 | Coghlan et al. |
| 2004/0075994 A1 * | 4/2004 | Kuo ........................ 362/31 |
| 2004/0125589 A1 * | 7/2004 | Sung ........................ 362/31 |
| 2004/0130883 A1 * | 7/2004 | Leu et al. ................. 362/31 |
| 2005/0259438 A1 * | 11/2005 | Mizutani et al. ........... 362/612 |

FOREIGN PATENT DOCUMENTS

| | | | |
|---|---|---|---|
| JP | 2003043220 A | * | 2/2003 |
| JP | 2004309532 A | * | 11/2004 |

* cited by examiner

BACKLIGHTING DEVICE FOR AN INFORMATION DISPLAY ELEMENT OF A PORTABLE OBJECT

This application claims priority from European Patent Application No. 04003854.9 filed Feb. 20, 2004, the entire disclosure of which is incorporated herein by reference.

BACKGROUND OF THE INVENTION

The present invention relates to a backlighting device for an information display element of a portable object such as a wristwatch. The backlighting device comprises a light guide plate having a front face and a rear face, a light reflector located on the rear face of the light guide plate and a source of visible light. This source of visible light feeds light beams at the edge or boundary of the light guide plate. These light beams spread in the light guide plate between its two faces to be directed for illumination of the display screen located above the front face of the light guide plate.

In the case of an object such as a wristwatch, the display element is understood to be a watch face, on which the hands indicate the time, a liquid crystal-type display screen, where time, text or image information can be displayed, or a combination of watch face and screen.

Devices for illumination from the back, which are referred to as backlighting devices, for display screens in particular of the liquid crystal type have already been described in the prior art. Such devices are encountered in particular in objects such as cordless mobile phones, portable computers or other types of portable objects in current use.

In these objects of relatively large dimension, it is generally simple to illuminate a display element uniformly from the back over its entire visible surface. To do this, illumination from the back is achieved by one or a plurality of light sources disposed to face layers of a light guide plate. These light sources feed light beams into the light guide plate so that the light is directed towards the display element. With several light sources spaced at a relatively substantial distance in relation to the visible portion of the display element, the display element can be illuminated relatively uniformly.

In the case of a wristwatch, it is difficult to provide several light sources to illuminate the display element from the back, since the area available inside the case is limited. Since the number of components to be mounted in said case must be reduced to fulfill all the desired functions of the watch, a single light source is generally provided to ensure illumination of the display element.

In the case of a traditional backlighting device, this light source is mounted in the case of the watch below the display element in a position close to the visible portion of the display element. Even if the light source is partially concealed below the display element, its radiation of light causes a halo around the position of the light source, which is visible to the outside via the display element.

Illumination of the display element from the back is therefore not uniform, since the light intensity of this halo is greater than the light intensity illuminating the rest of the display element. This is major disadvantage of such a backlighting device, if it is provided, for example, to fit an upmarket type of watch.

SUMMARY OF THE INVENTION

Therefore, the main aim of the invention is to remedy the above-mentioned disadvantages by providing a backlighting device for an information display element of a portable object, which allows the illumination of the display element to be uniform, in particular in a zone located around the light source.

On this basis, the invention relates to an aforementioned backlighting device for an information display element of a portable object such as a wristwatch, which is wherein it comprises a layer located between the front face of the light guide plate and a rear face of the display element of the portable object, said layer having at least one zone of partial opacity decreasing from a limit located close to the boundary area of the light guide plate, which receives the light beams of the light source, in order to attenuate the intensity of the light crossing said zone.

An advantage of the backlighting device according to the invention lies in the fact that the halo caused by a light source located below and close to the visible portion of the display element is attenuated by the zone with decreasing opacity. Hence, it is possible, because of this zone of decreasing opacity, to illuminate the display element of the portable object uniformly, which can also depend on the angle of vision of the display element. Therefore, a single light source can be sufficient to illuminate the display element. This light source can be a light emitting diode, which is mounted on a printed circuit board and is located in a compartment open at the top of a crosspiece mounted on the printed circuit board.

Naturally, as the light intensity of this halo decreases when moving away from the light source to a determined distance from this source, the partial opacity of the zone of the layer must also decrease when moving away from said source. This decrease in opacity of the zone, which extends to a given distance on the layer, can be non-linear, since the decrease in intensity of the halo as a function of the distance is also non-linear.

The zone with decreasing partial opacity is preferably obtained by a dye applied to or integrated into the layer, or by an offset, or by a semi-transparent metal covering of variable thickness, or by a metal covering pierced by a plurality of holes or formed by metal dots of variable diameter and spacing as a function of the resolution of the human eye. The dye used can be a colour shade of black or white or silver. This dye is, for example, the ink applied by a printing machine. The white colour can be used advantageously where the layer with the partially opaque zone forms an integral part of the front face of the light guide plate for a diffuse reflection of a portion of the light to be redistributed in the light guide plate.

The layer with the partially opaque zone can also be a light diffuser film or a light rectifier film located on the front face of the light guide plate.

Advantageously, on its periphery, the light guide plate has a rounded corner covered by a light-reflecting layer, which can be a completely opaque white paint coating or a metal covering. The light emitting diode is thus disposed below the rounded corner in order to feed the light beams in a vertical direction. In this way, the beams are reflected by the reflecting layer at the edge of the light guide plate in order to spread into the light guide plate between the front and rear faces.

A joint of silicon material can also join the upper portion of the light emitting diode to a lower surface of the rounded corner of the printed circuit board in order to limit optical losses. This joint is selected to have an intermediate refractive index between the refractive index of the transparent material of the light emitting diode and the refractive index of the light guide plate.

BRIEF DESCRIPTION OF THE DRAWINGS

The aims, advantages and features of the backlighting device for an information display element of a portable object will be more clearly evident from the following description of at least one embodiment of the invention in association with the drawings, wherein.

DETAILED DESCRIPTION OF THE DRAWINGS

In the following description, those elements of the backlighting device that are well known to the person skilled in the art in this technical field will not be explained in detail. The embodiment described specifically relates to a backlighting device for an information display element of a wristwatch. This display element can be a liquid crystal translucent-type screen or a watch face with sections transparent to visible light.

Figure 1:
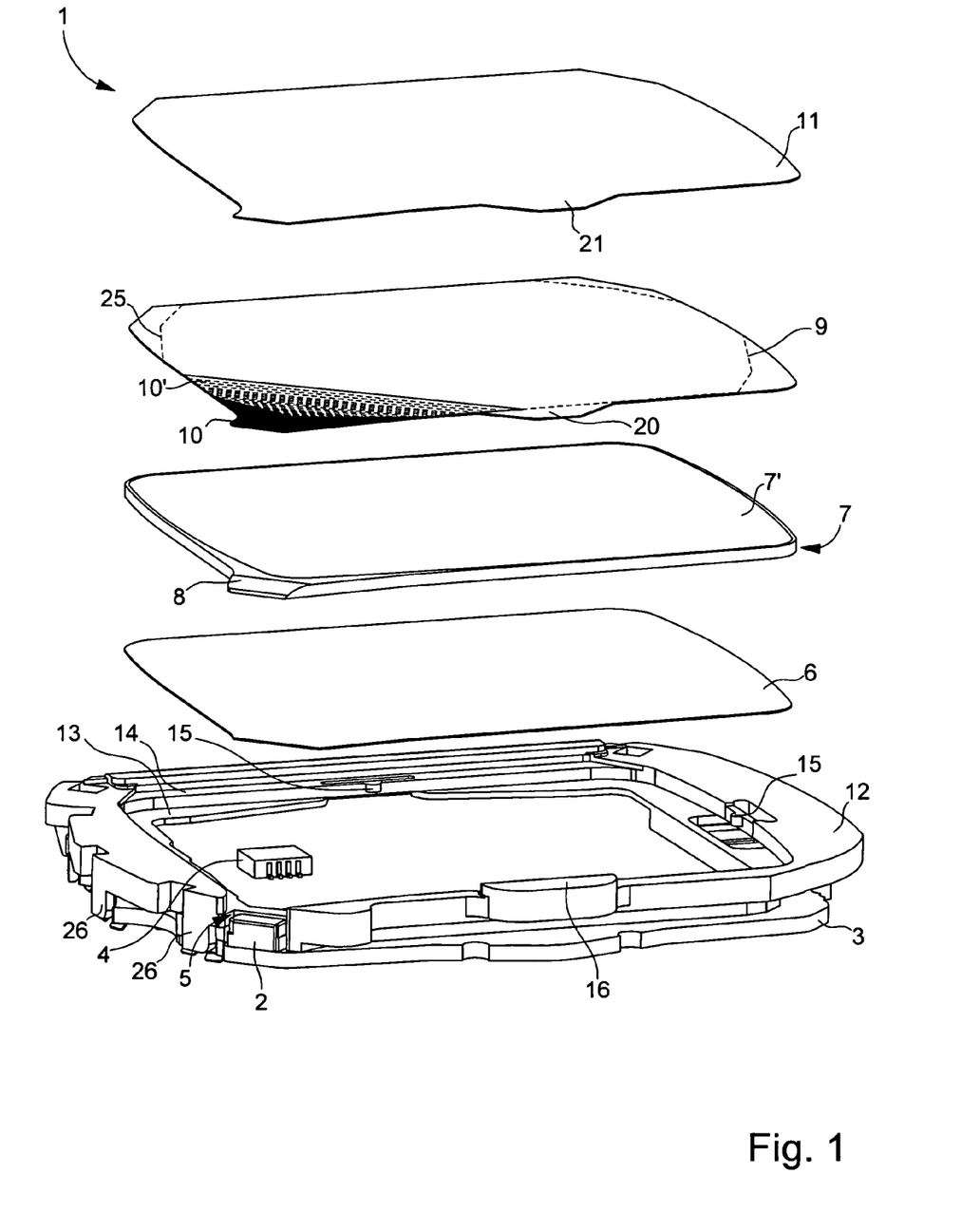
FIG. 1 shows a three-dimensional exploded view of the backlighting device according to the invention.

FIG. 1 shows a three-dimensional exploded view of an embodiment of the backlighting device 1 for fitting a wristwatch. In this embodiment, the backlighting device 1 for an information display element (not shown) firstly comprises a printed circuit board 3, on which a light source such as a vertically illuminating light emitting diode 2 and at least one electronic component 4 are fixed. The light emitting diode is fed by a power source (not shown) such as a battery or accumulator, which is electrically connected to the printed circuit board 3.

A crosspiece 12 in the form of a frame made of plastic material, preferably black or white in colour, is detachably mounted on the printed circuit board. This crosspiece is positioned by means of fitting means formed by legs 26 in contact with the edge of the printed circuit board 3. A compartment 5 on the outer section of the crosspiece is provided to house the light emitting diode. This compartment has a number of vertical walls partially surrounding said diode 2.

This compartment could naturally also be provided with vertical walls that completely surround the light emitting diode to enable it to only feed light beams in a vertical direction. An opaque frame (not shown) could also be inserted between the walls of the compartment and the light emitting diode.

The backlighting device 1 for a display element also comprises a light guide plate 7, a diffuse (specular) or mirror-type light reflector 6 mounted on the rear face of the light guide plate and a layer having a partially opaque zone 10' disposed between the front face of the light guide plate and the display element. A lens arrangement 7', which may be of nanometre or other size, for example, is provided on one portion of the front face of the light guide plate 7. This lens arrangement could also be provided on a portion of the rear face of the light guide plate 7.

The light guide plate 7 also has a rounded corner 8, which is covered with an opaque white paint coating or a metal covering. The light emitting diode 2 in its compartment 5 is disposed just below the rounded corner at the edge of the light guide plate. The light emitting diode feeds light beams vertically in the direction of the rounded corner, so that these beams are reflected in a diffuse manner by the white paint coating or in the manner of a mirror by the metal covering. After reflection at the rounded corner, the light beams spread between the front and rear faces of the light guide plate to be reflected by the reflector and deflected by the nanometre lens arrangement.

The light guide plate 7 with its nanometre lens arrangement can be made of PC (polycarbonate) or PMMA (polymethylmethacrylate).

In this embodiment, the layer with the partially opaque zone is a flexible light diffuser film 9, on which a flexible light rectifier film 11 can be mounted. This flexible light rectifier film 11 can be a T-BEF 90/24 film manufactured by 3M. This rectifier film is composed of microprisms on its front or rear face to rectify and orient the light towards the display element. Lines of microprisms can preferably be disposed perpendicularly to the axis of light transmission in the light guide plate for better rectification of the light and to maximise its intensity. Two rectifier films with crossed prism lines could also be used to maximise the light intensity in a pre-defined angle of vision of the display element.

Figure 3:
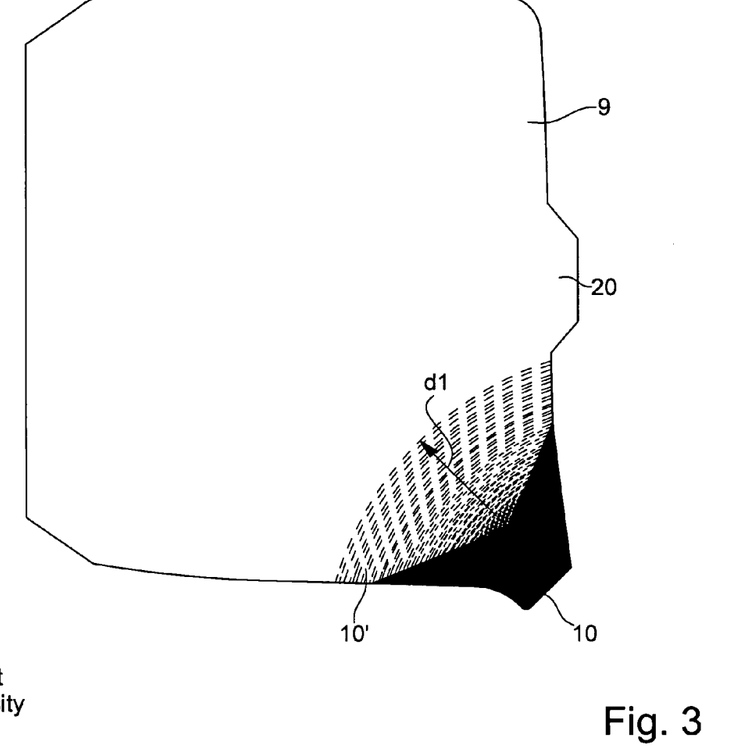
FIG. 3 shows a plan view of the diffuser film of the backlighting device according to the invention.

The partially opaque zone extends over the diffuser film 9 to a limit 25, which represents a boundary line of the visible portion of the display element up to a determined distance d1 from the light source, as may be seen more clearly by referring to FIG. 3. This distance d1 can depend on a natural angle of vision of the display element, which is not necessarily perpendicular to the display element in the case of a wristwatch.

It should be noted that the visible portion of the display element is defined by an opaque raised support of the watch glass (not shown), which holds the display element.

The light intensity of the halo, which is caused by the light source and is visible from outside the display element, decreases non-linearly from the limit 25 up to a distance d1, from which the light intensity is essentially uniform. In view of this, the opacity of the zone must therefore decrease non-linearly, like the light intensity of the halo, from the limit 25 up to a distance d1 from the light source to ensure a uniform illumination of the entire display element. The partial opacity of the zone can be about 80% from the limit 25 to 0% at the distance d1.

Figure 6:
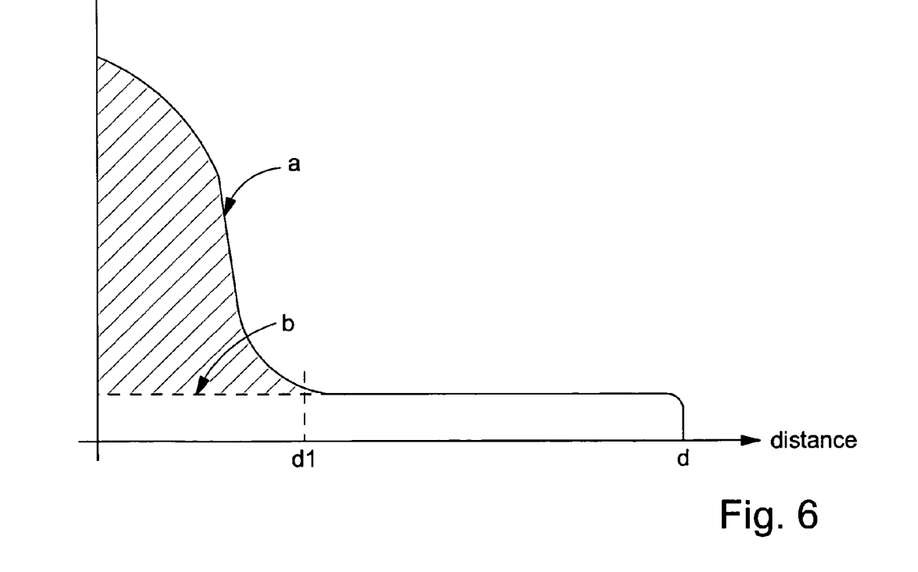
FIG. 6 shows a simplified graph of the light intensity of the light emanating from the backlighting device without attenuation and with attenuation of intensity as a function of the distance from the light source.

FIG. 6 shows a simplified representation of the light intensity across the display element as a function of the distance in relation to the position of the light source. It can be seen that the light intensity of the halo decreases non-linearly as far as a distance d1, from which it may be considered that the light intensity is more or less constant. Without a layer with a partially opaque zone, the light intensity through the display element is shown by curve a. With this layer, the light intensity is shown as uniform by curve b attenuated by said opaque zone, as shown by the hatched section. As a result of this, the opacity at each point of the zone must correspond to the level of intensity shown on curve a.

The partially opaque zone 10', shown in a simplified manner in FIGS. 1 and 3, on the diffuser film 9, can be obtained by a dye deposited on or integrated into the flexible film of the diffuser, or by an offset. The dye used can be a colour shade of black or white. This black dye is ink applied by a printing machine, for example. In the case of a black colour, the light passing through the partially opaque zone is partly absorbed but lost, whereas with a white colour, the light is partially reflected in a diffuse manner and returned into the light guide plate to reduce the losses of useful photons. These recovered photons can be directed towards other less luminous zones of the light guide plate 7.

In place of a dye, the partially opaque zone 10' can also be obtained by a semi-transparent metal covering of variable thickness, or by a metal covering pierced by a plurality of holes of variable diameter and spacing as a function of the resolution of the human eye, or by a metal covering formed by a plurality of metal dots of variable diameter and spacing, which are obtained via a template with pierced holes. This metal covering can be made by a vacuum metallisation process and the holes of the thin covering or of the template can be pierced by a laser beam or other photolithographic process.

The partially opaque zone can, of course, be formed by a different layer from the diffuser film. This zone can be formed directly on the front face of the light guide plate, on the rectifier film 11 or on the rear face of the display element. In the case of a zone on the light guide plate, it would be preferable to select a white dye shading from a limit corresponding to the boundary line of the visible portion of the display element from the side of the light source. With this white colour deposited directly on the light guide plate, the light is partially reflected in a diffuse manner and thus allows useful photons to be recovered, as explained above.

Since the backlighting device must be easily manipulated in assembly operations in a wristwatch case, all the elements forming it must be assembled beforehand. To do this, with reference to FIG. 1, the crosspiece in the form of frame 12 firstly comprises a first inside shoulder 13 having two flexible fingers 15 disposed on side walls of the first shoulder 13. The reflector 6 and the light guide plate 7 are held between a support face of the first shoulder and the two flexible fingers 15.

The crosspiece also comprises a second inside shoulder 14 above the first shoulder 13, in the case where it is provided to mount a diffuser film 9 and/or a rectifier film 11. The diffuser film 9 is firstly placed in abutment against the second shoulder and is held by means of a tab 20 inserted into a housing 16 of a side wall of the second shoulder. The rectifier film 11 is then placed in abutment against the diffuser film 9 and is held, as in the case of the diffuser film, by means of a tab 21, which is also inserted into the housing 16. In this way, all the light transmitting or reflecting elements are held in the crosspiece, which is itself assembled on the printed circuit board, on which the light emitting diode 2 is fixed.

The reflector 6, the light guide plate 7, the diffuser film 9 and the rectifier film 11 each have a surface area greater than or equal to the surface area of the visible portion of the display element.

It is also evident from FIG. 1 that the diffuser film, on which the zone with decreasing opacity has been provided, has a section of the diffuser film, which is located on the rounded corner 8. This section of the diffuser film is covered with a completely opaque black layer 10, which extends as far as the limit of the start of the zone with decreasing opacity.

Figure 2A:
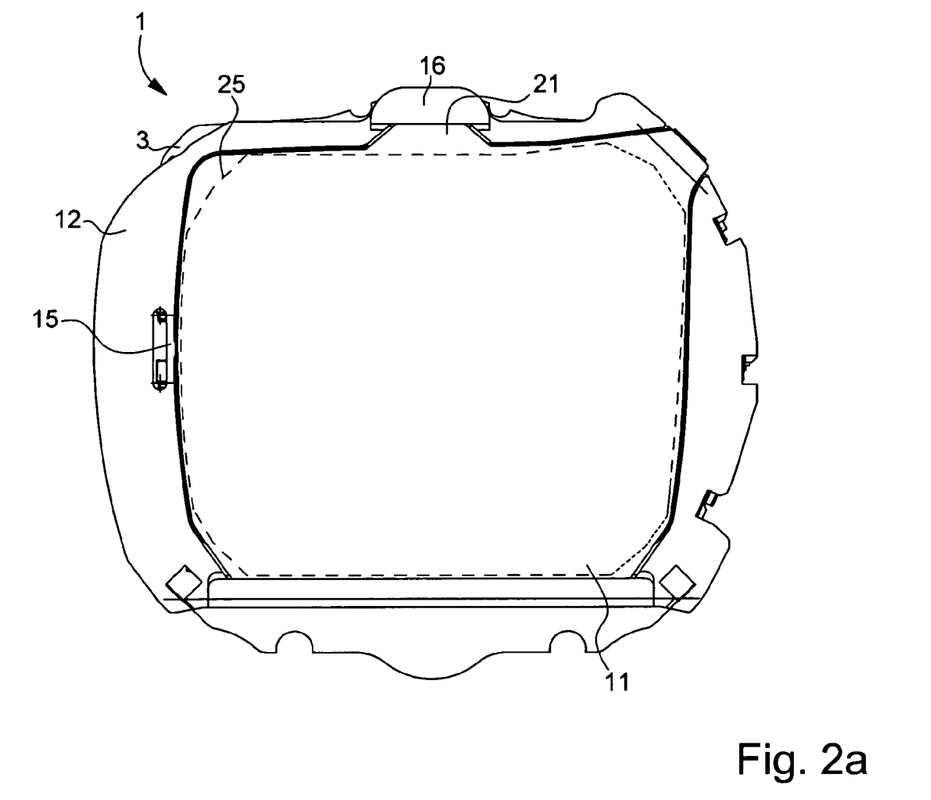
FIGS. 2a and 2b show a plan view and a three-dimensional view of the backlighting device according to the invention with all the elements assembled.
Figure 2B:
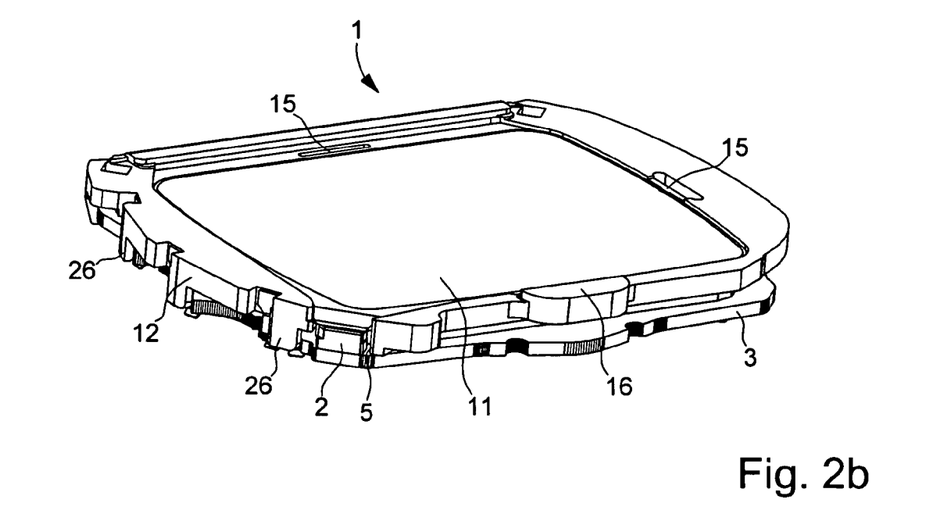

A clearer impression of the shape of the backlighting device with all its elements assembled can be seen from FIGS. 2a and 2b. The elements forming said device in FIGS. 2a and 2b will not be described, since they have already been described above in particular with reference to FIG. 1.

Two variants of the backlighting device are additionally explained with reference to FIGS. 4 and 5. Those elements explained above naturally have identical reference numerals and will only be explained in a simplified manner.

The backlighting device shown in partial section comprises the printed circuit board 3, the light emitting diode 2 fixed to the printed circuit board, the crosspiece 12 with the compartment 5 of the diode 2, the reflector 6, the light guide plate 7, the diffuser film 9 and finally the rectifier film 11.

Figure 4:
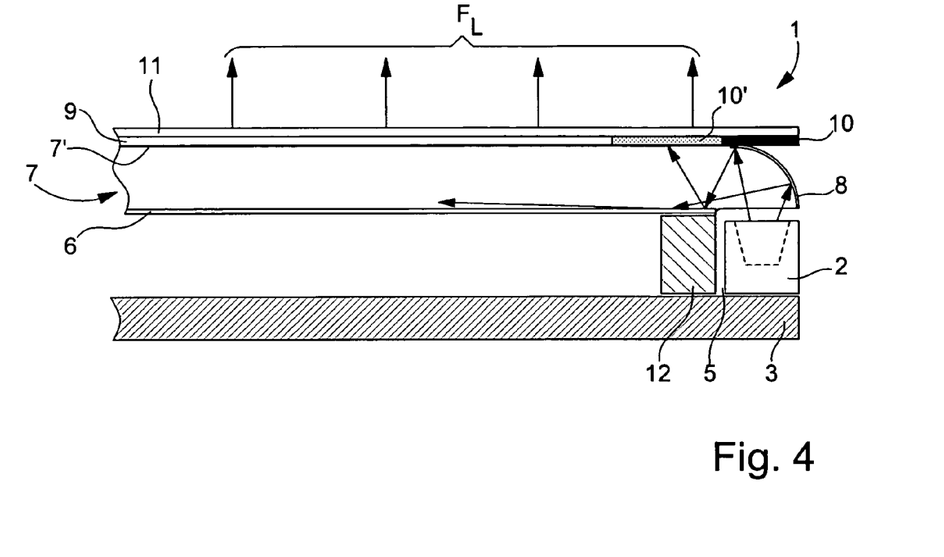
FIG. 4 shows a schematic view in partial section of a first embodiment of the backlighting device according to the invention at the level of the light source.

As shown in FIG. 4, the light emitting diode 2 is positioned at a short distance from the rear face of the light guide plate directly below the rounded corner. An air gap thus separates the upper face of the diode 2 from the rounded corner 8. An edge of the reflector 6 comes to lie flush with an upper edge of the compartment. The edge of the reflector could preferably be directly on the edge of the light outlet of the light emitting diode so as not to lose the reflected light through the rounded corner.

Because of the zone 10' of partial opacity decreasing as the distance from the diode increases, the light $F_L$ redirected and oriented by all the light transmitting and reflecting elements has an intensity, which is essentially equal at every point to thus illuminate the display element uniformly.

Figure 5:
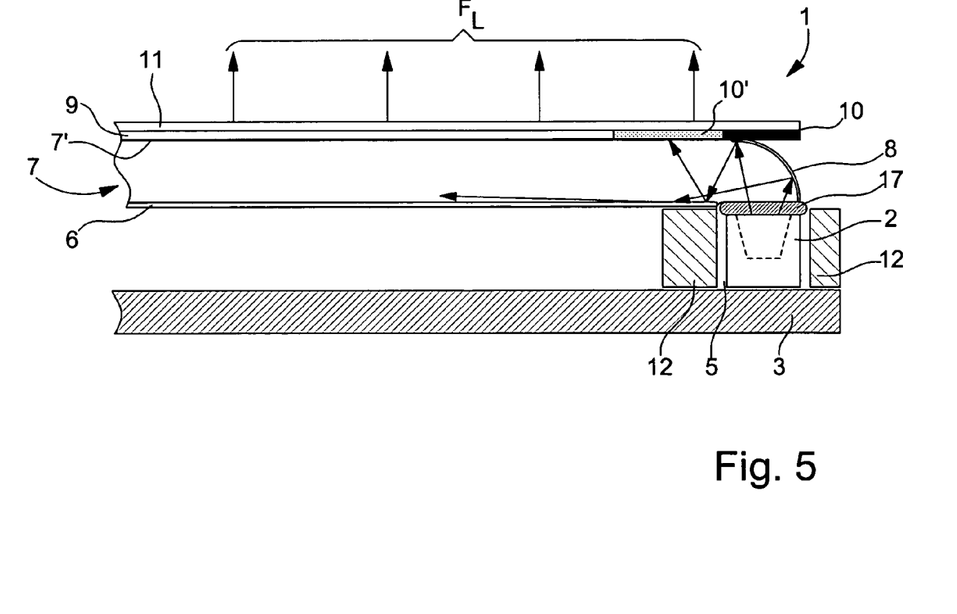
FIG. 5 shows a schematic view in partial section of a second embodiment of the backlighting device according to the invention at the level of the light source.

In a variant shown in FIG. 5, a joint made of silicon 17 is provided to join the upper portion of the light emitting diode 2 to a lower surface of the rounded corner of the printed circuit board. The joint preferably has an intermediate refractive index between the refractive index of the transparent material of the light emitting diode and the refractive index of the light guide plate.

It would, of course, also be conceivable to place the diode in the same plane as the light guide plate so that it feeds light beams via an edge of the light guide plate in a horizontal direction. In this case, the light guide plate is no longer provided with a rounded corner.

Working from the above description, numerous variants of the backlighting device may be conceived by a person skilled in the art without departing from the framework of the invention as defined by the claims. One or more other partially opaque zones can be provided on the layer in the case where it is desirable to intentionally attenuate the light intensity to give particular effects through the display element. A possible provision for the device is to only use the reflector with the light guide plate, on which one or more partially opaque zones are provided, to limit production costs. The reflector and the plate may form only a single element.

What is claimed is:

1. A backlighting device for an information display element of a wristwatch, said device comprising a light guide plate having a front face and a rear face, a light reflector located on the rear face of the light guide plate, and a single source of visible light, which is a light emitting diode for feeding light beams to a boundary or edge of the light guide plate, which spread in the light guide plate and between said rear and front faces, wherein the device comprises a layer located above the front face of the light guide plate between the front face of said light guide plate and a rear face of the display element of the portable object, said layer having at least one zone with partial opacity decreasing from a limit located close to a boundary area of the light guide plate, which receives the light beams of the light emitting diode located below and close to a visible portion of the display element, in order to attenuate the intensity of a light halo crossing said zone, which is caused by the light source, and wherein the light guide plate has on a periphery thereof a rounded corner covered by a light-reflecting layer, said light emitting diode being disposed below the rounded corner in order to feed the light beams in a vertical direction in relation to the rear face of the light guide plate so that said beams are reflected by the reflecting layer at the edge of the light guide plate and spread into the light guide plate between the front and rear faces.

2. The backlighting device according to claim 1, wherein said one zone with partial opacity decreasing non-linearly from the limit close to the edge of the light guide plate is obtained by a dye applied to or integrated into the layer, or by a semi-transparent metal covering of variable thickness, or by a metal covering pierced by a plurality of holes of varying diameter and spacing, which are smaller in size than a human eye's resolution, or by a metal covering formed from a plurality of metal dots of varying diameter and spacing.

3. The backlighting device according to claim 2, wherein the layer with the partially opaque zone forms an integral part of the front face of the light guide plate or of a polarising film of the display element.

4. The backlighting device according to claim 2, wherein the layer with the partially opaque zone is a light diffuser film or a light rectifier film located on the front face of the light guide plate.

5. The backlighting device according to claim 2, wherein the zone with decreasing partial opacity is obtained by a shading dye of black or white or silver, which extends from the limit, which corresponds to a boundary line of the visible portion of the display element, to a distance determined in relation to the position of the light emitting diode.

6. The backlighting device according to claim 1, wherein it comprises a crosspiece forming a frame, in which the reflector, the light guide plate and a diffuser are held, and wherein a compartment is cut into the periphery of the crosspiece to house the light emitting diode, fixed on a printed circuit board, the crosspiece being detachably mounted and positioned by fitting means on the printed circuit board.

7. The backlighting device according to claim 1, wherein the light guide plate, the reflector and the partially opaque zone form a single element.

8. The backlighting device according to claim 1, wherein said display element is a liquid crystal device.

9. A backlighting device for an information display element of a potable object, said device comprising a light guide plate having a front face and a rear face, a light reflector located on the rear face of the light guide plate, and a source of visable light feeding light beams to a boundary or edge of the light guide plate, which spread n the light guide plate and between said rear and front faces, wherein the device comprises a layer located above the front face of the light guide plate between the front face of said light guide plate and a rear face of the display element of the portable object, said layer having at least one zone with partial opacity decreasing from a limit located close to a boundary area of the light guide plate, which receives the light beams of the light source located below and close to a visible portion of the display element, in order to attenuate the intensity of a light halo crossing said zone, which is caused by the light source, wherein the device further comprises a crosspiece forming a frame, in which the reflector, the light guide plate and a diffuser are held, wherein a compartment is cut into the periphery of the crosspiece to house the light source, fixed on a printed circuit board, the crosspiece being detachably mounted and positioned by fitting means on the printed circuit board, and wherein the crosspiece comprises two flexible fingers disposed on side faces of a first inside shoulder to hold the reflector and the light guide plate inserted between a support face of the first shoulder and each flexible finger.

10. The backlighting device according to claim 9, wherein above the flexible fingers, the crosspiece comprises a second inside shoulder to receive a flexible diffuser film, which is held by means of a tab inserted into a housing cut into a side face of the second shoulder of the crosspiece, and wherein a flexible transparent light rectifying film is located on the diffuser film and held by another tab in the housing of the second shoulder.

11. The backlighting device according to claim 1, wherein the light guide plate has, on a periphery thereof, the rounded corner covered by the light reflecting layer and a lens arrangement of nanometre size on a section of the front or the rear face.

12. The backlighting device according to claim 11 wherein a portion of the diffuser film is located on the rounded corner, wherein the portion of the diffuser film is covered with a completely opaque black layer, which extends as far as the limit of the start of the zone with decreasing opacity, and wherein the rounded corner is covered with an opaque white layer or with a metal covering.

13. A backlighting device for an information display element of a portable object, said device comprising a light guide plate having a front face and a rear face, a light reflector located on the rear face of the light guide plate, and a source of visable light feeding light beams to a boundary or edge of the light guide plate, which spread in the light guide plate and between said rear and front faces, wherein the device comprises a layer located above the front face of the light guide plate between the front face of said light guide plate and a rear face of the display element of the portable object, said layer having at least one zone with partial opacity decreasing from a limit located close to a boundary area of the light guide plate, which receives the light beams of the light source located below and close to a visible portion of the display element, in order to attenuate the intensity of a light halo crossing said zone, which is caused by the light source, said light source being a light-emitting diode.

wherein the device further comprises a crosspiece forming a frame, in which the reflector, the light guide plate and a diffuser are held, and wherein a compartment is cut into the periphery of the crosspiece to house the light source, fixed on a printed circuit board, the crosspiece being detachably mounted and positioned by fitting means on the printed circuit board, wherein the light emitting diode is housed in the compartment of the crosspiece comprising side walls, which partially or completely surround said diode from an upper surface of the printed circuit board, and wherein an edge of the reflector comes to lie flush with an upper edge of the compartment.

14. The backlighting device according to claim 13, wherein a joint of silicon material joins the upper portion of the light emitting diode to a lower surface of a rounded corner of the printed circuit board, said joint having an intermediate refractive index between the refractive index of the transparent material of the light emitting diode and the refractive index of the light guide plate.

15. A backlighting device for an information display element of a portable object, said device comprising a light guide plate having a front face and a rear face, a light reflector located on the rear face of the light guide plate, and a source of visible light feeding light beams to a boundary or edge of the light guide plate, which spread in the light guide plate between said rear and front faces, wherein the device comprises a layer located between the front face of the light guide plate and a rear face of the display element of the portable object, said layer having at least one zone with partial opacity decreasing from a limit located close to the boundary area of the light guide plate, which receives the light beams of the light source, in order to attenuate the intensity of the light crossing said zone, wherein the light guide plate has on a periphery thereof a rounded corner covered by a light-reflecting layer and a lens arrangement of nanometre size on a section of its front or rear face, and wherein the light source is disposed below the rounded corner in order to feed the light beams in a vertical direction so that said beams are reflected by the reflecting layer at the edge of the light guide plate and spread into the light guide plate between the front and rear faces.

16. A backlighting device for an information display element of a portable object, said device comprising a light guide plate having a front face and a rear face, a light reflector located on the rear face of the light guide plate, and a source of visible light feeding light beams to a boundary or edge of the light guide plate, which spread in the light guide plate between said rear and front faces, wherein the device comprises a layer located above the front face of the light guide plate between the front face of said light guide plate and a rear face of the display element of the portable object, said layer having at least one zone with partial opacity decreasing from a limit located close to a boundary area of the light guide plate, which receives the light beams of the light source, in order to attenuate the intensity of the light crossing said zone, wherein it comprises a crosspiece forming a frame, in which the reflector, the light guide plate and a diffuser are held, and wherein a compartment is cut into a periphery of the crosspiece to house the light source, fixed on a printed circuit board, the crosspiece being detachably mounted and positioned by fitting means on the printed circuit board, and wherein the crosspiece comprises two flexible fingers disposed on side faces of a first inside shoulder to hold the reflector and the light guide plate inserted between a support face of the first shoulder and each flexible finger.

17. A backlighting device for an information display element of a portable object, said device comprising a light guide plate having a front face and a rear face, a light reflector located on the rear face of the light guide plate, and a source of visible light feeding light beams to a boundary or edge of the light guide plate, which spread in the light guide plate and between said rear and front faces,     wherein the device comprises a layer located above the front face of the light guide plate between the front face of said light guide plate and a rear face of the display element of the portable object, said layer having at least one zone with partial opacity decreasing from a limit located close to a boundary area of the light guide plate, which receives the light beams of the light source located below and close to a visible portion of the display element, in order to attenuate the intensity of a light halo crossing said zone, which is caused by the light source;

wherein the light guide plate has on a periphery thereof a rounded corner covered by a light-reflecting layer and a lens arrangement of nanometre size on a section of a front or rear face, and wherein the light source, is disposed below the rounded corner in order to feed the light beams in a vertical direction so that said beams are reflected by the reflecting layer at the edge of the light guide plate and spread into the light guide plate between the front and rear faces.

\* \* \* \* \*